Jan. 6, 1970  P. N. RIGOPULOS  3,488,768
SELF-CLEANING ULTRAFILTER
Filed Feb. 8, 1968  2 Sheets-Sheet 1

Peter N. Rigopulos
INVENTOR.

BY *Andrew F. Kehoe,*
*Attorney*

Peter N. Rigopulos
INVENTOR.

BY Andrew F. Kehoe,
Attorney

United States Patent Office 3,488,768
Patented Jan. 6, 1970

3,488,768
SELF-CLEANING ULTRAFILTER
Peter N. Rigopulos, Melrose, Mass., assignor to Amicon Corporation, Lexington, Mass., a corporation of Massachusetts
Filed Feb. 8, 1968, Ser. No. 704,148
Int. Cl. B01d 13/00
U.S. Cl. 210—23                                     10 Claims

ABSTRACT OF THE DISCLOSURE

Novel self-cleaning ultrafiltration apparatus comprising an anisotropic membrane so mounted on a foraminous support that, when placed in a centrifuge device, a major component of the centrifugal force tends to wipe the membrane clean during the filtering action.

Background of the invention

There have been a number of analytical procedures developed in the biochemical art wherein it is required to remove protein from liquid samples in order to have a more concentrated protein sample which can be analyzed effectively, or in order to have a more protein-free filtrate for analysis, or to study protein-binding attributes of various chemicals in combination with various protein samples. A whole host of other analytical procedures, involving not only proteins but macromolecular species in general, have also been developed wherein it is necessary to remove a macromolecular component from a liquid sample.

The manipulative techniques available for carrying out such separations have, of course, depended upon the availability of suitable analytical devices. Most such separations have necessarily involved such techniques as vacuum distillation, dialytic separation or chromatographic separation. More recently, the advent of anisotropic membranes, i.e. membranes having an extremely thin microporous barrier layer and a relatively thick macroporous support layer, has provided an improved tool for carrying out ultrafiltration separations. Their special utility is largely due to the combination of their surprisingly high rejection of particular species with their high mass-transport capabilities.

Ultrafiltration is a process of separation whereby a solution, containing a solute of molecular dimensions significantly greater than the molecular dimensions of the solvent in which it is dissolved, is depleted of the solute by being subject to such pressure that the solvent is forced to flow through a membrane. "Ultrafiltration" is the term preferably used to describe such pressure-activated separations involving solutions of solutes of from about 500 molecular weight and above; the term is also conveniently used for processes involving, instead of dissolved molecules, colloidal-sized particles. The particular advantage of such membrane-modulated ultrafiltration separation processes lies in their potential speed, mild operating conditions and low operating cost compared to various other separation processes such as evaporation, dialysis, ultracentrifugation, chemical precipitation, and the like. These advantages become especially critical when thermally unstable or biologically active materials are to be processed or when relatively large volumes of solvent are present in a solution to be processed. However, the anisotropic membranes have been found to have such small effective pore sizes that their use has, thus far, been largely restricted to apparatus of sufficient size to mount a stirring apparatus thereon. The stirring apparatus is required to reduce the concentration polarization phenomena normally associated with the use of such membranes. Alternatively high-pressure, high-flow-velocity techniques are available for achieving excellent performance with these anisotropic membranes. However, the relatively heavy equipment required to achieve this type of operation is not suitable for most batch-type laboratory analytical procedures.

Summary of the invention

Therefore, it is an object of the present invention to provide a membrane assembly which is inexpensive, may be utilized with conventional laboratory apparatus, and which is suitable for use in analytical processes involving the separation of macromolecules from liquid compositions.

It is a further object of the invention to provide an assembly as defined above which provides a self-cleaning feature when in use, thereby minimizing any concentration polarization problem.

Another object of the invention is to provide a membrane separation device suitable for use in centrifugal equipment which device provides a generous compartment for accumulating solid material without excessive blocking of effective membrane-separation area.

Other objects of the invention will be obvious to those skilled in the art on reading this specification.

The aforesaid objects have been achieved by provision of a novel assembly useful with conventional centrifugal-separation apparatus and comprising an anisotropic membrane coupled with a fenestrated or macroporous support member therefor, said membrane being so arranged with respect to the assembly that centrifugal force which makes the filtration possible also tends to keep the filtration surface of the membrane clean, thereby avoiding the expected problem whereby the extremely small membrane pores would be plugged by solids or sludge in the sample being subject to filtration. To achieve this effect, upwardly facing primary membrane filter areas should be arranged at a relatively steep angle with respect to the vector of the centrifugal force, advantageously at an angle of less than about 22½°, and most advantageously less than about 15° with the vector of the centrifugal forces acting on the assembly. This steep angle provides means for assuring a major vector of the centrifugal forces are directed downwardly along the membrane surface. These forces cause sludge and macromolecular material, which would otherwise tend to plug or stick on the membrane surface, being retained to slide downwardly immediately on contact with the microporous membrane surface on the wall of the apparatus, thereby achieving a continuous cleaning action during use of the membrane assembly. For convenience fenestrated and macroporous support members will be referred to herein by the generic term foraminous.

Membranes which are useful in the apparatus of the invention are highly anisotropic, submicroscopically porous, membranes formed of polymers having good mechanical integrity, most advantageously those crystalline and/or glassy thermoplastic polymers known to the art. They are described more fully in co-pending and commonly-owned U.S. patent application, Ser. No. 669,648, filed Sept. 21, 1967 by Alan S. Michaels et al. and entitled, High Flow Membranes, and now abandoned. By crystalline and glassy polymers are meant those materials which possess from about 5 to 50% by weight crystallinity as measured by X-ray diffraction techniques known to the art and/or a glass transition temperature (Tg) of at least about 20° C. Particularly advantageous are polymers of inherently low water sorptivity which unlike the cellulose acetate materials known to the membrane art may be allowed to dry during storage without losing their beneficial mechanical and processing characteristics. These polymers are those having water-absorptivities of less than about 10% by weight of moisture at 25° C. and 100% relative humidity. Such membranes are of particular advantage because, unlike any of the anisotropic membranes known to the prior art, they may be stored under relatively dry conditions: they need not be shipped, nor stored between uses, under water. Among such polymers are the modacrylic polymer sold by Union Carbide Corporation under the trade designation Dynel, polycarbonates such as that sold under the trade name Lexan, poly (vinylchloride) and the like.

The submicroscopically-porous anisotropic membranes useful in practice of this invention consist of a macroscopically thick film of porous polymer, usually more than about 0.002 and less than about 0.050 of an inch in thickness. One surface of this film is an exceedingly thin, but relatively dense barrier layer of "skin" of from about 0.1 to 5.0 microns thickness of microporous polymer in which the average por diameter is in the millimicron range, for example from 1.0 to 500 millimicrons—i.e., about one-tenth to one hundredth the thickness of the skin. The balance of the film structure is a support layer comprised of a much more coarsely porous polymer structure through which fluid can pass with little hydraulic resistance. When such a membrane is employed as a "molecular filter" with the "skim side" in contact with fluid under pressure, virtually all resistance to fluid flow through the membrane is encountered in the "skin," and molecules or particles of dimensions larger than the pores in the "skin" are selectively retained. Because the skin layer is of such extraordinary thickness, the over-all hydraulic resistance to fluid flow through the membrane is very low; that is, the membrane displays surprisingly high permeability to fluids. Furthermore, tendency of such membranes to become plugged or fouled by molecules or particles have been discovered to be surprisingly low if sufficiently effective steps are taken to stop accumulation of matter on the surface thereof.

Such anisotropic membranes should be distinguished from the isotropic, sometimes called homogeneous, membranes which membranes are analagous to conventional filters. Attempts to make such membranes with desirably high retentivity cause increased hydraulic resistance to the point that they are virtually useless as filter media. Anisotropic membranes of the type useful in the instant invention should also be distinguished over diffusive-type filters wherein molecular diffusion is achieved under the action of a concentration or activity gradient. These membranes—some of which may exhibit anisotropic flow—characteristics contain few, if any, pores and are not suitable for the achievement of high flow rates. Cellulose acetate membranes, of the type known to the art and often used in water desalination, are examples of this latter type of membrane.

Illustrative embodiments of the invention

Figure 1:
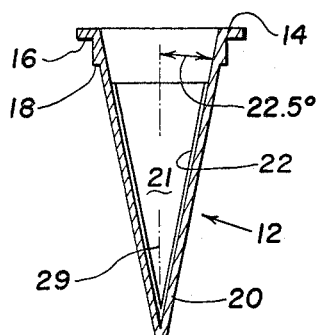
FIGURE 1 is a sectional and schematic view, in elevation, of a membrane-holding assembly according to the invention.
Figure 2:
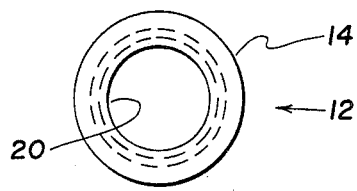
FIGURE 2 is a plan view of the assembly of FIGURE 1.

Referring to FIGURE 1, it is seen that a centrifuge tube insert assembly 12 comprises a filtration assembly having a collar member 14 which collar 14 forms means for holding assembly 12 in operating relationship to a centrifuge tube or the like and includes a plurality of concentric flanges 16 and 18. This plurality of flanges provides means for adopting apparatus 12 for fit into centrifuge tubes of various sizes: flange 16 forming means by which apparatus 12 is supported by large tubes, and flange 18 forming means by which apparatus 12 is supported by smaller tubes.

Figure 3:
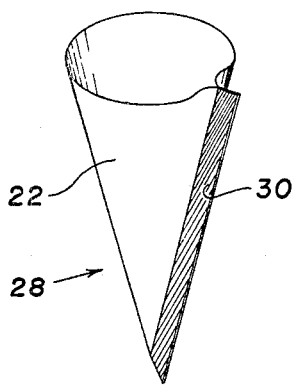
FIGURE 3 is an isometric view of a removable membrane as used in the assembly of FIGURE 1.
Figure 6:
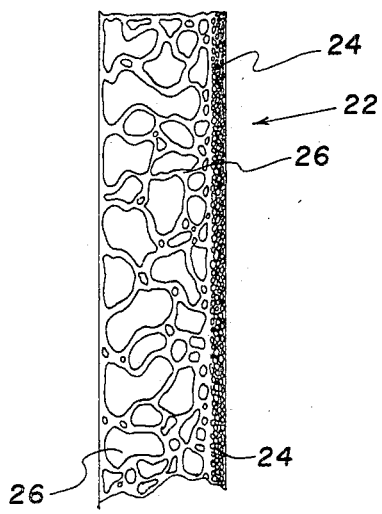
FIGURE 6 is a schematic cross-sectional view of an anisotropic membrane useful in the ultrafiltration apparatus according to the invention.

A highly porous sintered, high-density polyethylene conical support wall 20, shaped as a receptacle 21 and which is integral with collar member 14, supports an anisotropic membrane 22. Membrane 22, shown more clearly in FIGURES 3 and 6 is formed of a modacrylic film as will be described more fully below and comprises an extremely thin and dense skin layer 24 and a thicker macroporous support layer 26. The anisotropic membrane 22 is conveniently formed of an essentially triangular sheet which sheet has been shaped into a cone 28 by means of heat-sealed overlap 30.

In operating, it has been found that membrane cone 28 will be held in snug support relationship to wall 20 by centrifugal forces.

For descriptive purposes, it is convenient in describing and claiming the invention to refer to an imaginary perpendicular line through the center of the porous container 21 as the major axis 29 thereof. When upwardly-facing support walls such as wall 20 are utilized, it is most advantageous that the angle formed between said wall 20 and said major axis 29 is not greater than about 22.5 degrees. Such an angle assures that a major component of centrifugal forces acting on the membrane will tend to cause retained material to be swept continuously into the bottom of receptacle 21, thereby maintaining the surface of membrane 22 free of flow-restricting contaminants.

Figure 4:
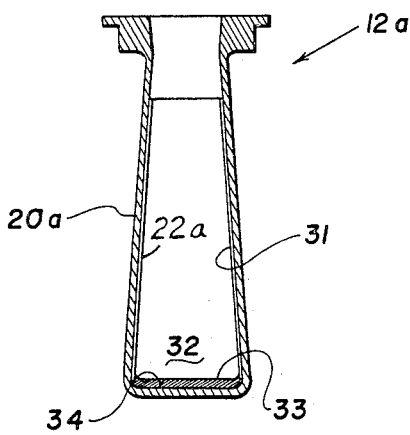
FIGURE 4 is a sectional and schematic view, in elevation, of a second membrane-holding device according to the invention wherein said membrane is adherent to a porous support structure.

FIGURE 4 illustrates a further embodiment of the invention. In this embodiment an anisotropic membrane 22a which is essentially the same type of membrane used in FIGURE 1 has been formed to adhere to the surface of a sintered porous polyolefin wall 20a of tube insert assembly 12a. The polyolefin is a high density polyethylene, one thirty-second of an inch in thickness and available from the Atlas Minerals and Chemical Division of the Electric Storage Battery Company under the trade designation Vyon.

Insert assembly 12a with the anisotropic membrane 22a adhering thereto is particularly useful in applications where the membrane can be washed and utilized a plurality of times. Plugging of the membrane pores on walls 20a is, in this case, entirely avoided because a major part of the downwardly-facing membrane surface 31 is protected from impact thereon by particles under the acceleration of the g-forces generated in centrifuge operation. Moreover, the relatively enlarged sludge-receiving section 32 of the apparatus described in FIGURE 4 is particularly suited for separations carried out on liquid compositions comprising a large quantity of solid material. This material will be collected in section 32 without excessive blocking of the effective membrane area. Bottom 33, in this embodiment may be covered with a membrane surface or sealed with a non-porous coating 34 as shown in FIGURE 4.

Figure 5:
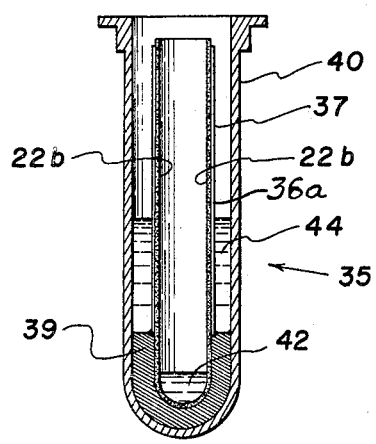
FIGURE 5 is a side view of a membrane-holding assembly according to the invention wherein liquid is filtered into a central receiving tube.

FIGURE 5 illustrates still another membrane assembly 35 of the invention wherein anisotropic membrane 22b is mounted around the outer wall 36a of a porous centrally-positioned receiving tube 37. This tube 37 is mounted in a support means 39 formed of a foamed thermoplastic shaped to the configuration of glass centrifuge tube 40. In operation of assembly 35, filtrate 42 is collected inside tube 37 while sludge 44 is collected around the outer perimeter of tube 37.

Figure 7:
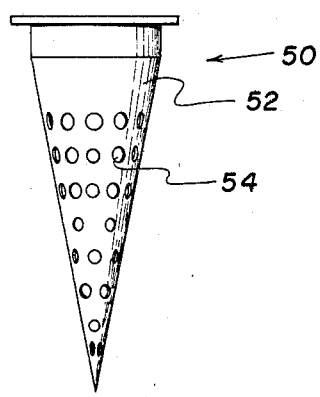
FIGURE 7 is a sectional view of a fenestrated support cone of the invention.

As seen in FIGURE 7, the membrane support cone 50 may be formed of a non-porous wall 52 with sufficient apertures 54 therein to provide adequate flow paths for the membrane. Such fenestrated cones 50 provide sufficient flow for some purposes, but often it is desirable to introduce between said cone 50 and the membrane contained therein, for example, a slightly ribbed surface to avoid blinding of those portions of the downstream side of the membrane which would be pressed snugly against cone 50.

Figure 8:
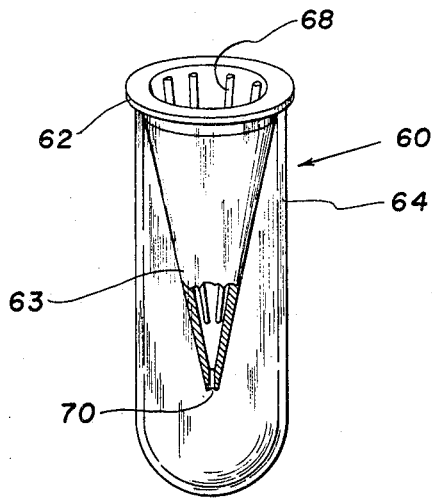
FIGURE 8 shows a further support member for holding a conical membrane thereby forming an assembly according to the invention.

In FIGURE 8, support member 60 is formed so that the flange 62 of larger diameter cone number 60 cooperates with a centrifuge tube 64 to keep the cone in upright position. Ribs 68, integral with cone 63 are spaced along the sides thereof serving the function of providing a liquid flow path for filtered liquid. An orifice 70 at bottom of cone 63 provides means by which filtrate can be transferred into tube 64 which stem forms a convenient compartment for storage and handling of the sample of filtered material.

The membrane used in the illustrative examples was formed according to the following procedure:

A solution was formed comprising 240 grams of zinc chloride and 3300 grams of dimethylformamide. This solution was formed with agitation at about 20° C. After settling overnight, a gallon of the solution was taken and treated with 70 drops of 37% aqueous hydrochloric acid. The acid was added dropwise until a cloudiness of the non-treated solution had cleared.

A quantity of 850 grams of the resultant solution was utilized for dissolving 114.8 grams of the fibrous form of a modacrylic resin available under the trade designation Dynel type 130 from Union Carbide Corporation. The resulting resin solution had a viscosity of 320 centipoises at 25° C. and 11.9% solids.

A quantity of this was placed in a 100 ml. centrifuge tube and centrifuged in a laboratory centrifuge (Model CL Clinical Centrifuge supplied by Internation Equipment Co.) for 30 minutes.

Teflon strips were affixed along each of the four sides of a glass plate and a drawdown bar was used to cast a film of the centrifuged resin solution. The total depth of the film was approximately 10 to 11 mils. After waiting for about one minute to allow the flow imperfections in the film surface to even out, the cast film was dipped into a continuous flow water bath at about 23° C. for a period of one minute. The film was then stripped from the glass plate and tested.

The membrane, 3 inches in diameter, was found to pass about 3 cubic centimeters of water in 30 seconds at 55 p.s.i.g. hydraulic pressure. The membrane was found to reject 100% of protein in each of a blood sample and a urine sample when the sample centrifuged for 15 minutes in a typical clinical centrifuge. These tests were run in apparatus as shown in FIGURES 1 and 3. After use, the conical insert was removed, washed and used again several times with no discernible decrease in effectiveness.

To form the conical membrane element shown in FIGURE 3, this membrane was merely cut into a triangular sheet and heat sealed for a 2 second cycle with a conventional laboratory heat sealing instrument sold under the trade designation Quick-Seal Ty–210.

Care should be taken to provide a membrane cone having an angle suitable for forming a snug fit against the sintered macroporous polyethylene support wall so that the centrifugal forces will not tear at the membrane cone.

What is claimed is:
1. Apparatus suitable for use as a filtration element in centrifugal separation processes comprising
    (1) an anisotropic membrane characterized by a maximum pore size of 500 millimicrons,
    (2) a foraminous support for said membrane,
    (3) and means for holding said apparatus in operating relationship with a sample-receiving centrifuge tube, said relationship being such that centrifugal force applied to such apparatus comprises a major vector tending to wipe said membrane surface clean.
2. Apparatus as defined in claim 1 wherein said support is formed of a macroporous receptacle-shaped member.
3. Apparatus as defined in claim 1 having an anisotropic membrane arranged with respect to said holding means such that a major part of said membrane is free of impingement by any vector of said centrifugal forces.
4. Apparatus as defined in claim 1 wherein said membrane is removably mounted in said support member.
5. Apparatus as defined in claim 1 wherein said membrane is adherent to said support member.
6. Apparatus as defined in claim 1 wherein said membrane is adjacent to the inside of said foraminous support receptacle, the barrier layer of said membrane facing away from said receptacle.
7. Apparatus as defined in claim 1 wherein said membrane is adjacent the outside of said foraminous support receptacle.
8. Apparatus as defined in claim 1 wherein said membrane surface and said centrifugal force form an angle of 22.5 degrees or less.
9. Apparatus as defined in claim 8 wherein said angle is less than about 15 degrees.
10. A method of centrifugally separating a macromolecular fraction from a fluid composition comprising the steps of
    (1) subjecting said composition to centrifugal force tending to force said composition through an anisotropic membrane and
    (2) maintaining a major portion of said membrane surface in such angular relationship to the vector of such centrifugal force that the angle of incidence between the force vector acting on the composition to be centrifugally separated and the membrane surface does not exceed about 22.5°, thereby tending to continuously clean said membrane surface of any solid or macromolecular material impinging thereon.

References Cited

UNITED STATES PATENTS

| | | | |
|---|---|---|---|
| 2,854,143 | 9/1958 | Huyak | 210—361 X |
| 3,400,074 | 9/1968 | Grenci | 210—23 |

REUBEN FRIEDMAN, Primary Examiner

F. A. SPEAR, JR., Assistant Examiner

U.S. Cl. X.R.

210—78, 380, 409, 455, 497, 500

PO-1050
(5/69)

UNITED STATES PATENT OFFICE
CERTIFICATE OF CORRECTION

Patent No. 3,488,768  Dated January 6, 1970

Inventor(s) Peter N. Rigopulos

It is certified that error appears in the above-identified patent and that said Letters Patent are hereby corrected as shown below:

Column 1, line 66, "However" should start a new paragraph;

Column 3, line 19, "por" should read --pore--;

Column 3, line 26, "skim" should read --skin--;

Column 3, line 31, "thickness" should read --thinness--;

Column 3, lines 49-50, "branes--some of which may exhibit anisotropic flow--characteristics contain few" should be --branes--some of which may exhibit anisotropic flow-characteristics- contain few--.

SIGNED AND SEALED

JUN 23 1970

(SEAL)
Attest:

Edward M. Fletcher, Jr.
Attesting Officer

WILLIAM E. SCHUYLER, JR.
Commissioner of Patents